(12) United States Patent
Cheng et al.

(10) Patent No.: US 7,036,127 B2
(45) Date of Patent: Apr. 25, 2006

(54) LEGACY CORBA NAME SPACE INTEGRATION USING WEB APPLICATION SERVERS

(75) Inventors: Michael Cheng, Austin, TX (US); James Irwin Knutson, Austin, TX (US); Russell Ley Newcombe, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 596 days.

(21) Appl. No.: 09/975,342

(22) Filed: Oct. 11, 2001

(65) Prior Publication Data

US 2003/0074484 A1    Apr. 17, 2003

(51) Int. Cl.
*G06F 9/44*    (2006.01)

(52) U.S. Cl. .................. 719/315; 719/316; 707/103 R; 707/104.1

(58) Field of Classification Search ................ 719/315, 719/316; 707/104.1, 103 R
See application file for complete search history.

(56) References Cited

U.S. PATENT DOCUMENTS

| | | | |
|---|---|---|---|
| 5,745,683 A | 4/1998 | Lee et al. ................ 395/200.8 |
| 5,873,092 A | 2/1999 | Cheng et al. ............... 707/103 |
| 6,014,700 A * | 1/2000 | Bainbridge et al. ......... 709/226 |
| 6,044,379 A * | 3/2000 | Callsen .................... 707/103 R |
| 6,208,986 B1 | 3/2001 | Schneck et al. ............... 707/3 |
| 6,233,586 B1 | 5/2001 | Chang et al. ............... 707/103 |
| 6,269,378 B1 * | 7/2001 | Quirt ..................... 707/103 R |
| 6,438,590 B1 * | 8/2002 | Gartner et al. ............. 709/219 |
| 6,578,050 B1 * | 6/2003 | Daggubati et al. ....... 707/104.1 |
| 6,633,923 B1 * | 10/2003 | Kukura et al. ............. 719/316 |
| 6,751,646 B1 * | 6/2004 | Chow et al. ................ 718/105 |

* cited by examiner

*Primary Examiner*—William Thomson
*Assistant Examiner*—Li Zhen
(74) *Attorney, Agent, or Firm*—Duke W. Yee; David A. Mims, Jr.; Gerald H. Glanzman (57) ABSTRACT

A method, apparatus, and computer implemented instructions for binding object references from a remote name space into a local name space using a Web application. Information is collected to generate a request for an object reference. Information, such as an application server to use as the source, a source name space path, an identification of destination server, and a destination name space path to which the object reference is to be bound, may be used. The request is sent using a communications protocol, such as hypertext transfer protocol to the application server to be used as the source for the object reference. An object reference is located using the name space. The object reference may be serialized into a format, such as a common object request broker architecture format and sent to the destination. The destination will unserialize the object reference and perform binding using the destination name space path.

18 Claims, 5 Drawing Sheets

LEGACY CORBA NAME SPACE INTEGRATION USING WEB APPLICATION SERVERS

BACKGROUND OF THE INVENTION

1. Technical Field

The present invention relates to an improved data processing system. In particular, the present invention relates to a method, apparatus, and computer instructions to bind object references from a remote name space into a local name space using a Web application.

2. Description of Related Art

Common Object Request Broker Architecture (CORBA) is an architecture that enables objects to communicate with one another regardless of the programming language or operating system of the objects. An object is a self-contained software module or piece of a program. CORBA is a standard for communicating between distributed objects. CORBA provides a means to execute programs written in different programming languages located on various platforms within a network. Using the standard protocol Internet Inter-ORB Protocol (IIOP), a CORBA-based program from any vendor, on almost any computer, operation system, programming language, and network, can interoperate with a CORBA-based program from the same or another vendor, on almost any other computer, operating system, programming language, and network. CORBA was developed by an industry consortium, which is named the Object Management Group (OMG).

There are several implementations of CORBA, the most widely used being IBM's System Object Model (SOM) and Distributed System Object Model (DSOM) architectures. Netscape also uses CORBA in the Netscape ONE (Open Network Environment) platform. Two competing models are Microsoft's Component object Models (COM) and Distributed Component Object Model (DCOM) and Sun Microsystems' Remote Method Invocation (RMI).

CORBA was designed to allow interoperation of distributed systems. However, until the CORBA Interoperable Name Space (INS) becomes widely available, there is no standard means of contacting a remote name space to obtain an object reference. An object reference unambiguously identifies an object and is never reused to identify another object. Vendors are implementing the CORBA INS as a means of providing a standardized mechanism for accessing a remote name space, but this will not work for the large set of applications existing today, which do not support the CORBA INS.

At runtime, a CORBA client makes requests to remote CORBA objects through an Object Request Broker (ORB). The ORB handles the details involved in routing a request from client to object, and routing the response to its destination. Many ORBs store the information about an object in vendor-specific internal structures. There is a standard form, called the Interoperable Object Reference (IOR) that ORBs use to pass object references to one another across vendor boundaries. The ORB will stringify the reference of an object into a sequence of hexadecimal numbers so that the reference is able to pass over the network without being translated by any of the various filters. If a client does not know the servers ORB, then the client will not be able to access a remote name space on the server. Different vendors do not use the same bootstrap protocol for obtaining a reference to the name service and may use different ORBs, thus creating problems obtaining lookup or reference to a CORBA object.

Therefore, it would be advantageous to have an improved method, apparatus, and computer instructions to provide means for accessing the remote name space.

SUMMARY OF THE INVENTION

The present invention provides a method, apparatus, and computer implemented instructions for binding object references from a remote name space into a local name space using a Web application. Information is collected to generate a request for an object reference. Information, such as an application server to use as the source, a source name space path, an identification of destination server, and a destination name space path to which the object reference is to be bound, may be used. The request is sent using a communications protocol, such as hypertext transfer protocol to the application server to be used as the source for the object reference. An object reference is located using the name space The object reference may be serialized into a format, such as a common object request broker architecture format and sent to the destination. The destination will unserialize the object reference and perform binding using the destination name space path.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
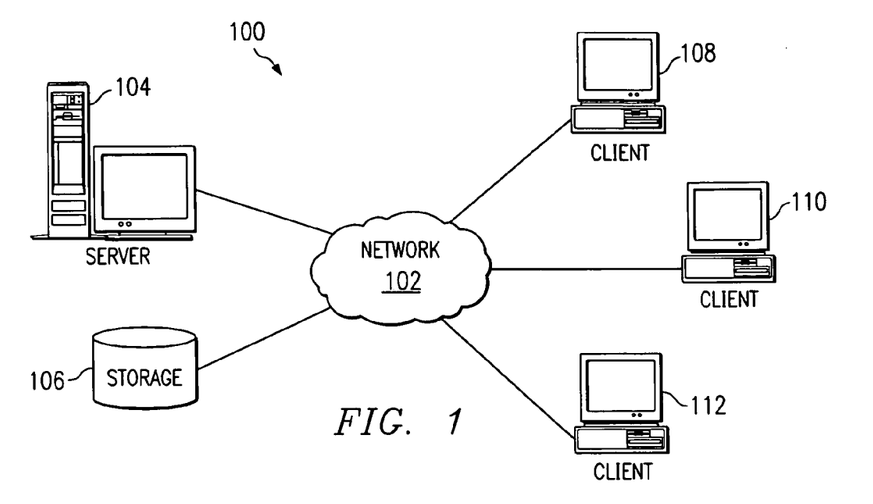
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, Web pages and applications to clients 108–112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
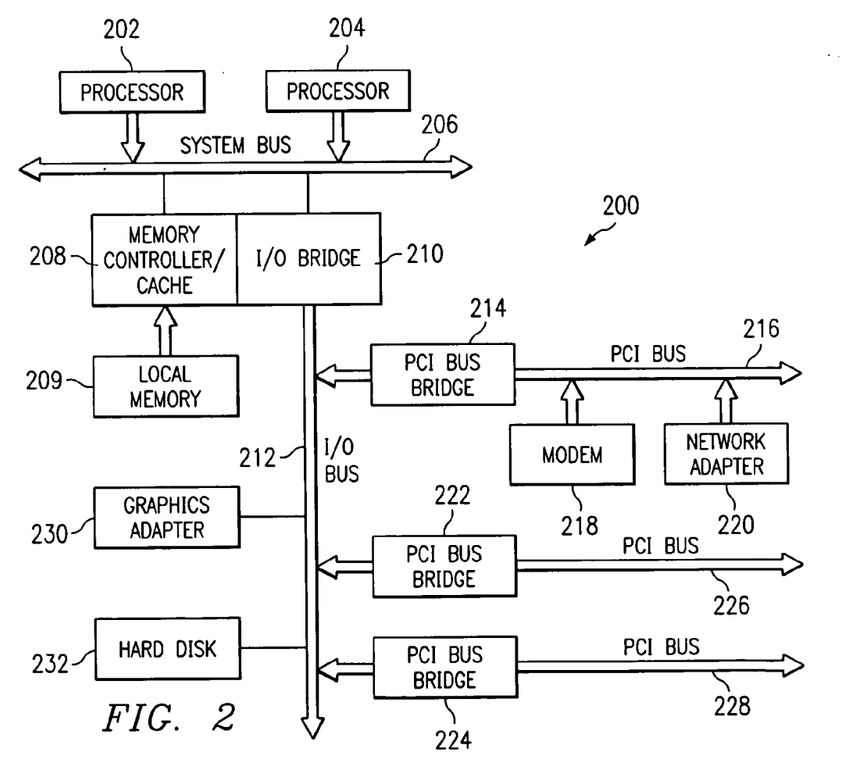
FIG. 2 is a block diagram of a data processing system that may be implemented as a server in which the present invention may be implemented.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108–112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pseries system, a product of International Business Machines Corporation in Armonk, N.Y., running the Advanced Interactive Executive (AIX) operating system or LINUX operating system.

Figure 3:
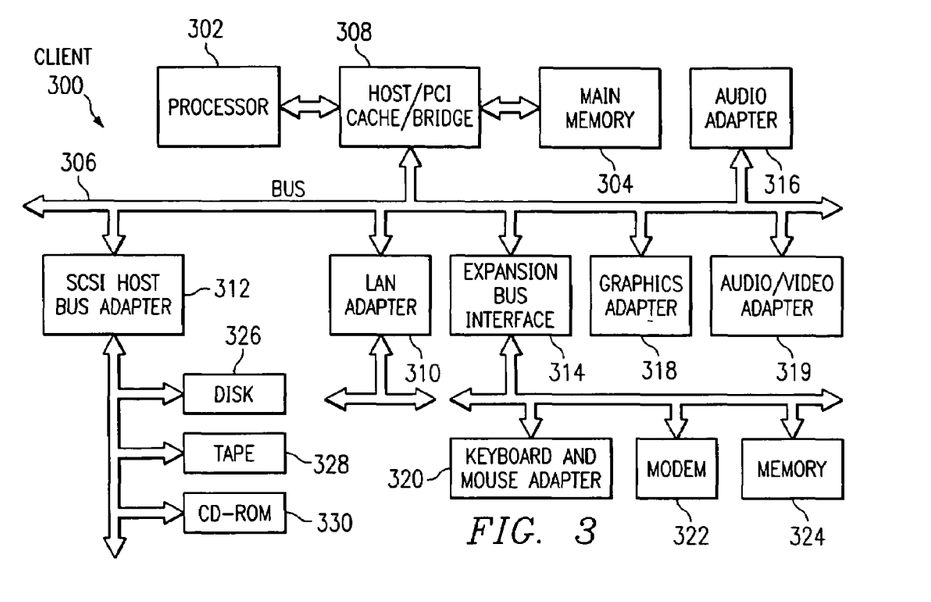
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. The processes of the present invention for identifying Web pages may be implemented within a client, such as data processing system 300.

In this example, data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a personal digital assistant (PDA) device, which is configured with ROM and/or flash ROM in order to provide non-volatile memory for storing operating system files and/or user-generated data.

Figure 4:
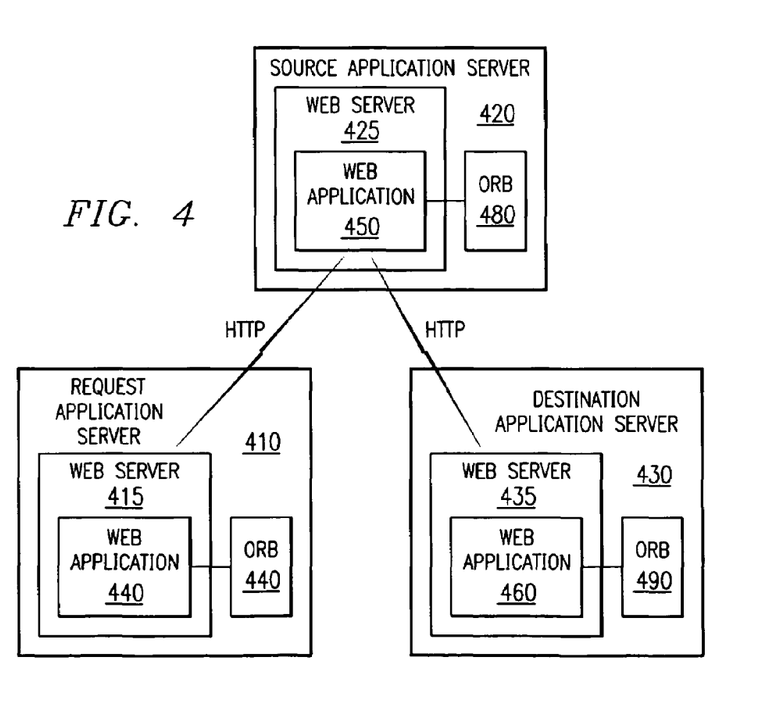
FIG. 4 is a block diagram of application servers in accordance with a preferred embodiment of the present invention.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance. Next, FIG. 4 is a block diagram of application servers in accordance with a preferred embodiment of the present invention. An application server provides an environment for execution of web applications and remote objects. Web applications contain web components such as web pages, servlets and JSPs. A web server provides a means for using a web application's components through the use of the hypertext transport protocol (HTTP) for communications. Typically, an object request broker (ORB) provides a means for using remote objects such as CORBA objects or Enterprise JavaBeans through the use of the IIOP protocol for communications. Application servers typically provide additional services.

One such service is the name service which is used for location a remote object by name. Examples of name services are the Java naming and directory interface (JNDI) and COS Naming for CORBA objects. JNDI is a programming interface for connecting Java programs to naming and directory services. Each name service has a particular means for access. For JNDI, an InitialContext class name is configured for the desired JNDI implementation. A new instance of this class is then created which represents the root context of the name tree. COS Naming has no standard means for access. Each vendor implementing COS Naming can choose their own mechanism for bootstrapping an initial context representing the root of the name tree. Name context provide a means of navigating the name tree, looking up content in the name tree, binding (adding) objects into the name tree with a particular name at a particular location, and unbinding (removing) objects from the name tree.

In a preferred embodiment of the present invention Request application server 410 starts by sending a request for an object to remote source application server 420. Source application server 420 looks up the object reference and sends the object reference to destination server 430, which binds the object reference into the local name space. An object reference is the information or data needed to identify an object.

Each application server has a copy of the Web application of the present invention installed on it. Request application server 410 contains Web application 440 running in Web server 415. Source application server 420 contains Web application 450 running in Web server 425. Destination server 430 contains Web application 460 running in Web server 435. In this example, each application server also has an ORB. The application servers communicate using the HTTP protocol. Request application server 410 uses Web server 415 to communicate with Web server 425 on source application server 420. Source application server 420 uses Web server 425 to communicate with Web server 435 on destination application server 430. This mechanism bypasses the problematic use of non-standard name space bootstrap over IIOP by the ORBs for obtaining remote references. The Web application, in the source and destination application servers, use the ORB to obtain a name service reference, which is a specific and well known type of CORBA object reference. The name service reference is used to obtain or bind the desired object reference.

Figure 5:
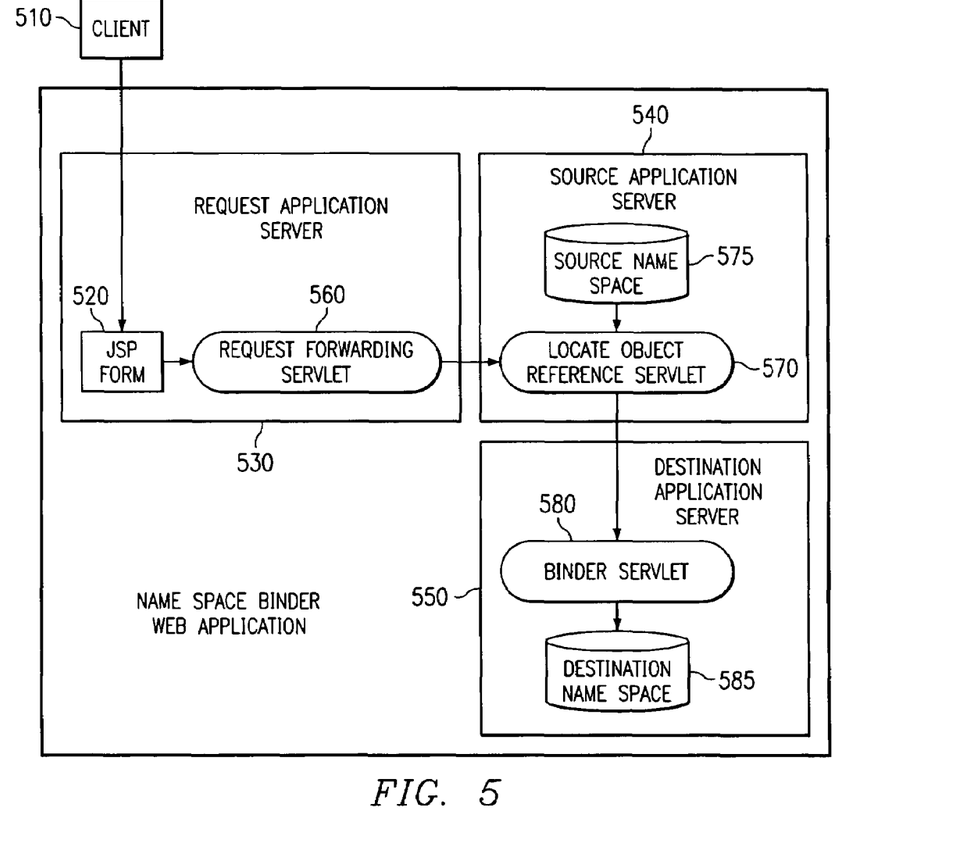
FIG. 5 is block diagram of the name space binder Web application in accordance with a preferred embodiment of the present invention.

FIG. 5 is block diagram of the Name Space Binder Web application in accordance with a preferred embodiment of the present invention. Client 510 executes a Java Server Page (JSP) form, such as JSP form 520, on a request application server, such as request application server 530. A JSP form is an HTML page with embedded Java source code that is executed in the Web server or application server. Additionally, the request application server may be the source application server 540, destination application server 550, or any other application server that has the application installed on it. JSP form 520 captures the binding information, such as the application server URL to use as the source, the source name space path, the URL for the destination application server, and the destination name space path to bind the object reference. Other information that may be captured could include the ORB host and port location if it is different from the application server host, Java initial context class name, and ORB class name. However, much of this information is constant and could be part of the configuration of the application rather than prompting a user for it. In general, the information that a user is prompted for are the two application server URLs and two name space paths.

Request forwarding servlet 560 is invoked in response to the user pressing a submit button on the JSP form. The request forwarding servlet parses the JSP form POST request and sends an HTTP redirect to the source application server. The HTTP POST request is used to transfer form data from a web client to the server. In this case, the POST request contains data for an obtaining a reference to an object. The object may be for example, a shopping cart for purchases or account number when accessing a bank account.

Next, locate object reference servlet 570 looks up the object reference on the source application server, such as source application server 540, using source name space database 575. This database includes data, such as a name or group of names defined using a naming convention. Although in this example a database is used for the source name space, other mechanisms may be used depending on the particular implementation. The name space store is transparent to the application which is using the name space. When the POST request is forwarded to the locate object reference servlet, the servlet retrieves the requested object reference using JNDI lookup techniques appropriate for that server. The servlet creates an instance of an initial context object. This object implements a naming context interface and represents the root of a naming system name tree. The POST request data includes the source name space path. The servlet uses the initial context object to perform a lookup operation using the source name space path. Depending on the particular server, the process or lookup techniques used by locate object reference servlet 570 may differ.

The locate object reference servlet then converts the object reference into a serialized IOR using the orb.object_to_string( ) method. This method is one that is available in CORBA. This serialized IOR is then attached to the HTTP POST request and forwarded on to a binder servlet using an HTTP redirect to the destination server.

In response to receiving the HTTP POST request, binder servlet 580 converts the serialized IOR back into an object reference by using the orb.string_to_object( ) method, available in CORBA, and then binds the object reference into the destination name space, such as destination name space 585, using techniques appropriate for the destination application server, such as destination application server 550. Binding refers to the way in which an existing object in one system can be located by clients in another system and associated with an appropriate view. In other words, binding causes the object reference to be linked to the source application server. Binding is similar to storing information in a database. The object that is bound in the name space is given a name. Usually it is of a hierarchical form such that the name space forms a tree of names of objects. Binding places the object reference into the name space such that a lookup of that name at a later point in time would retrieve the object reference.

For example, in the present invention, the servlet creates a new initial context instance. If the destination name space path is complex, intermediate name contexts from the root of the tree to the desired leaf location are created, if necessary. Then a bind (or rebind) operation is performed to bind the object reference to a particular named location in the destination name space.

In this example, the object reference is looked up by locate object reference servlet 570 using JNDI lookup techniques. The object reference is then converted into a serialized IOR CORBA format and sent to the destination server, such as destination application server 550. At the destination server, the serialized IOR is converted back into an object reference and binding is performed using the techniques implemented in the destination server.

Both context and non-context object references can be bound in this fashion. The advantage of using the mechanism is that the mechanism gets around the need to deal with proprietary bootstrapping mechanisms for obtaining a reference to a remote name space. The mechanism of the present invention allows binding remote references and federating name spaces without having to transport serialized IORs between application servers by hand. It is easy to bind any combination of application servers that have the application installed.

Figure 6:
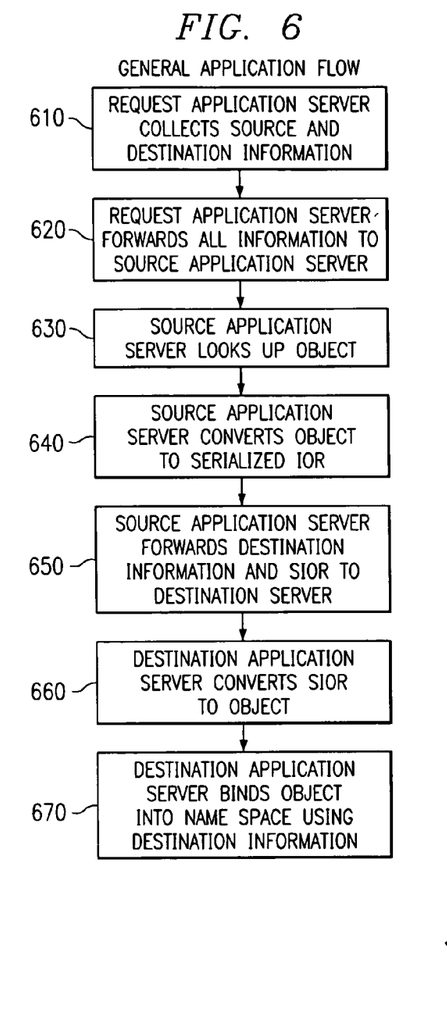
FIG. 6 is a flowchart of the general application flow in accordance with a preferred embodiment of the present invention.

FIG. 6 is a flowchart of the general application flow in accordance with a preferred embodiment of the present invention. The request application server, such as request application server 410 in FIG. 4, collects source and destination information, such as the URL and object name from the source and destination servers (step 610). The request application server forwards all information to the source application server, such as source application server 420 in FIG. 4, using a request forwarding servlet (step 620). The source application server looks up the object reference in the source name space using a locate object reference servlet (step 630). The source application server converts the object into a serialized IOR using the orb.object_to_string( ) method from CORBA (step 640). The source application server then forwards the destination information and serialized IOR to the destination application server (step 650). The destination application server, such as destination application server 430 in FIG. 4, converts the serialized IOR to the object reference using the orb.string_to_object( ) method from CORBA (step 660). The destination application server binds the object reference into the destination name space using the destination information and binding techniques appropriate for that server (step 670).

Figure 7:
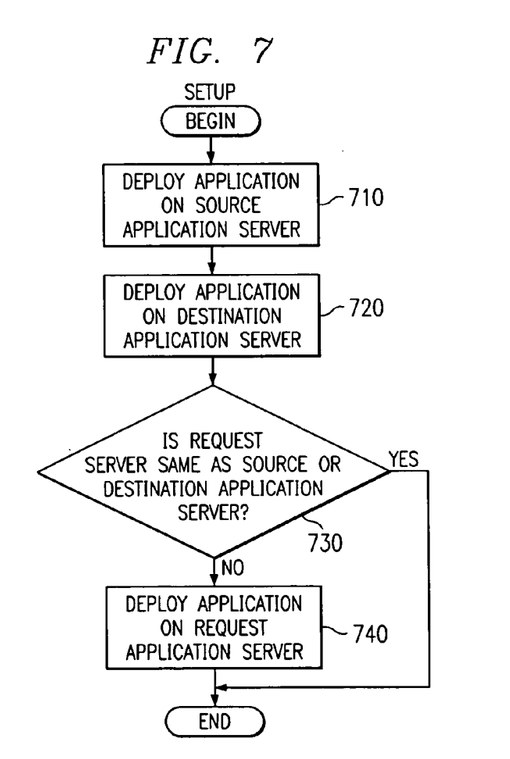
FIG. 7 is a flowchart of the setup of the Web application in accordance with a preferred embodiment of the present invention.

FIG. 7 is a flowchart of the setup for the present invention in accordance with a preferred embodiment of the present invention. The application for the present invention is deployed on the source application server (step 710). The application for the present invention is deployed on the destination application server (step 720). A determination is made as to whether the request application server is the same as either the source or destination application servers (step 730). If the request application server is the same as either the source or destination application servers, the process terminates thereafter. If the request application server is not the same as either the source or destination application servers, the application for the present invention is deployed on the request application server (step 740) with the process terminating thereafter.

Figure 8:
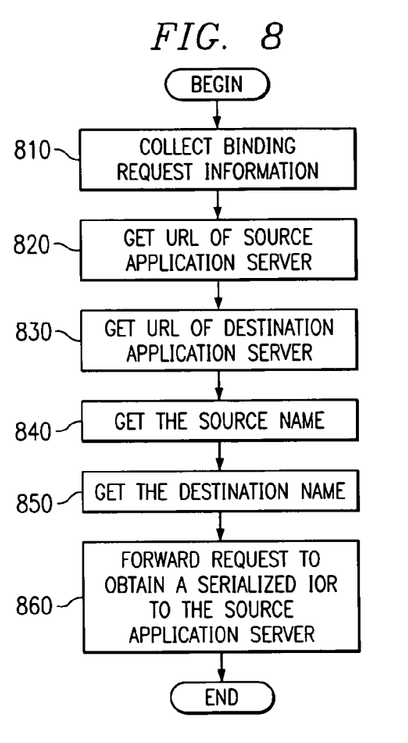
FIG. 8 is a flowchart of the locate request forwarding servlet process in accordance with a preferred embodiment of the present invention.

FIG. 8 is a flowchart of the locate request forwarding servlet process in accordance with a preferred embodiment of the present invention. The process illustrated in FIG. 8 may be implemented in a request forwarding servlet, such as request forwarding servlet 560 in FIG. 5.

Binding request information, collected from the JSP form such as JSP form 520 in FIG. 5, is received by the servlet (step 810). Next, the URL of the source application is retrieved (step 820). The URL of the destination application server is also retrieved (step 830). Next, the source name of object reference to bind is retrieved (step 840). The destination name of the object to bind also is retrieved (step 850). The request is then forwarded to the source application server to obtain a serialized IOR of the object reference (step 860) with the process terminating thereafter.

Figure 9:
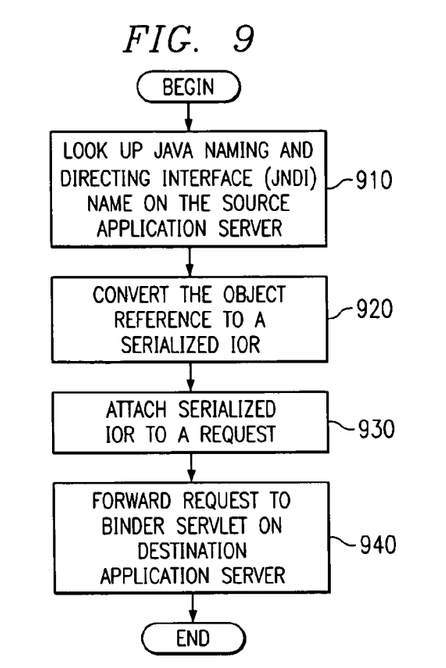
FIG. 9 is a flowchart of the locate object reference request process in accordance with a preferred embodiment of the present invention.

FIG. 9 is a flowchart of the locate object reference request process in accordance with a preferred embodiment of the present invention. The process illustrated in FIG. 9 may be implemented in a locate object reference servlet, such as request locate object reference servlet 570 in FIG. 5.

The object reference is looked up using the JNDI name on the source application server (step 910). The object reference from the source application server is converted to a serialized IOR (step 920). The serialized IOR is attached to a request (step 930). The request is forwarded to the binder servlet on the destination application server (step 940) with the process terminating thereafter.

Figure 10:
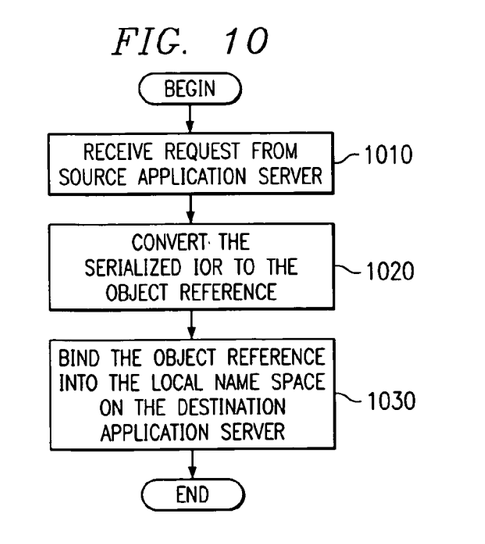
FIG. 10 is a flowchart of the bind serialized IOR servlet process in accordance with a preferred embodiment of the present invention.

Next, FIG. 10 is a flowchart of the bind serialized IOR servlet process in accordance with a preferred embodiment of the present invention. The process illustrated in FIG. 10 may be implemented in a binder servlet, such as binder servlet 580 in FIG. 5.

A request is received from the source application server to bind the serialized IOR (step 1010). The serialized IOR is converted to the object reference (step 1020). The object reference from the source application server is bound into the local name space on the destination application (step 1030) with the process terminating thereafter. This enables the destination application server to access the object on the source application server. At this point the object reference for the object on the source application server can be accessed in the destination application server by performing a local name space lookup.

Therefore, the present invention provides an improved method, apparatus, and computer implemented instructions for accessing a remote name space. The present invention can be implemented by the large set of applications existing today that do not support the CORBA INS as a means to contact remote name spaces to obtain an object reference. It also eliminates problems obtaining lookup or reference to an object due to incompatibility of different protocols and vendor ORBs.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A data processing system comprising:
a bus system;
a communications unit connected to the bus system;
a memory connected to the bus system, wherein the memory includes a set of instructions; and
a processing unit connected to the bus system, wherein the processing unit executes the set of instructions to collect information to create a request to bind an object reference from a remote name space on a source application server into a local name space on a destination application server, wherein the request includes an identification of a source, a source name space path, an identification of a destination, and a destination name space path used to bind the object reference and wherein the remote name space uses a different object request brokering architecture than the local name space; forward the request to a source application server using the identification of the source; search for the object reference in the remote name space using the source name space path; responsive to locating the object reference in the remote name space on the source application server, serialize the object reference to a serialized interoperable object reference; attach the serialized interoperable object reference to the request; redirect the request to a destination application server using the identification of the destination; convert the serialized interoperable object reference back to the object reference; and bind the object reference into the local name space on the destination application server using the destination name space path.

2. A data processing system for binding object references from a remote name space on a source application server into a local name space on a destination application server, the data processing system comprising:
collecting means for collecting information to create a request to bind an object reference, wherein the request includes an identification of a source, a source name space path, an identification of a destination, and a destination name space path used to bind the object reference and wherein the remote name surface uses a different object request brokering architecture than the local name space;
forwarding means for forwarding the request to a source application server using the identification of the source;
searching means for searching for the object reference in the remote name space using the source name space path;
responsive to locating the object reference in the remote name space on the source application server, serializing means for serializing the object reference to a serialized interoperable object reference;
attaching means for attaching the serialized interoperable object reference to the request;
redirecting means for redirecting the request to a destination application server using the identification of the destination;
converting means for converting the serialized interoperable object reference back to the object reference; and
binding means for binding the object reference into the local name space on the destination application server using the destination name space path.

3. The data processing system of claim 2, wherein the collecting means and the forwarding means are performed in a request application server.

4. The data processing system of claim 2, wherein the searching means, the serializing means, the attaching means, and the redirecting means are performed in a source application server.

5. The data processing system of claim 2, wherein the converting means anti the binding means are performed in a destination application server.

6. The data processing system of claim 2, wherein the collecting means uses a Java server page.

7. The data processing system of claim 2, wherein the request is a POST request.

8. The data processing system of claim 2, wherein the request is sent using hypertext transport protocol.

9. The data processing system of claim 2, wherein the identification of the destination is a universal resource locator.

10. A computer program product stored in a tangible computer readable medium for binding object references from a remote name space on a source application server into a local name space on a destination application server, the computer program product comprising:
first instructions for collecting information to create a request to bind an object reference, wherein the request includes an identification of a source, a source name space path, an identification of a destination, and a destination name space pat used to bind the object reference and wherein the remote name space uses a different object request brokering architecture than local name space;
second instructions for forwarding the request to a source application server using the identification of the source;
third instructions for searching for the object reference in the remote name space using the source name space path;
fourth instructions, responsive to locating the object reference in the remote name space on the source application server, for serializing the object reference to a serialized interoperable object reference;
fifth instructions for attaching the serialized interoperable object reference to the request;
sixth instruction for redirecting the request to a destination application server using the identification of the destination;
seventh instructions for converting the serialized interoperable object reference back to the object reference; and eighth instructions for binding the object reference into the local name space on the destination application server using the destination name spare path.

11. A method in a data processing system for binding object references from a remote name space on a source application server into a local name space on a destination application server, the method comprising:
collecting information to create a request to bind an object reference, wherein the request includes an identification of a source, a source name spare path, an identification of a destination, and a destination name space path used to bind the object reference and wherein the remote name space uses a different object request brokering architecture than the local name space;
forwarding the request to the source application server using the identification of the source;
searching for the object reference in the remote name space using the source name space path;
responsive to locating the object reference in the remote name space on the source application server, serializing the object reference to a serialized interoperable object reference;
attaching the serialized interoperable object reference to the request;
redirecting the request to the destination application server using the identification of the destination;
converting to serialized interoperable object reference back to the object reference; and
binding the object reference into the local name space on the destination application server using the destination name space path.

12. The method of claim 11, wherein the collecting step and the forwarding step are preformed in a request application server.

13. The method of claim 11, wherein the searching step, the serializing step, the attaching step, and the redirecting step are performed in a source application server.

14. The method of claim 11, wherein die converting step and the binding step are performed in a destination application server.

15. The method of claim 11, wherein the collecting step is performed using a Java server page.

16. The method of claim 11, wherein the request is a POST request.

17. The method of claim 11, wherein the request is sent using hypertext transport protocol.

18. The method of claim 11, wherein the identification of the destination is a universal resource locator.

* * * * *